US007472132B2

(12) United States Patent
Ho et al.

(10) Patent No.: US 7,472,132 B2
(45) Date of Patent: Dec. 30, 2008

(54) ATTRIBUTING MEMORY USAGE BY INDIVIDUAL SOFTWARE COMPONENTS

(75) Inventors: Wing Hong Ho, Cary, NC (US); Johannes Christiaan Laffra, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 254 days.

(21) Appl. No.: 11/417,961

(22) Filed: May 4, 2006

(65) Prior Publication Data

US 2007/0261043 A1 Nov. 8, 2007

(51) Int. Cl.

*G06F 12/00* (2006.01)
*G06F 17/30* (2006.01)
*G06F 9/44* (2006.01)
*G06F 9/45* (2006.01)

(52) U.S. Cl. ....................... 707/102; 707/205; 707/206; 717/104; 717/105; 717/144; 717/151; 717/154; 717/155; 717/156

(58) Field of Classification Search ................. 707/205, 707/206; 717/104, 105, 144, 151, 154, 155, 717/156

See application file for complete search history.

(56) References Cited

U.S. PATENT DOCUMENTS 6,370,684 B1 * 4/2002 De Pauw et al. ............ 717/124
6,721,865 B2 * 4/2004 Lewis ......................... 711/170
7,055,040 B2 * 5/2006 Klemba et al. .............. 713/156
7,085,789 B1 * 8/2006 Tarditi ........................ 707/206
2004/0158589 A1 8/2004 Liang et al.
2004/0181782 A1 9/2004 Findeisen
2005/0071460 A1 3/2005 Mitchell et al.
2005/0114844 A1 5/2005 Betancourt et al.

OTHER PUBLICATIONS

*Net Memory Profiler*, SciTech Software AB, http://www.scitech/memprofiler/Default.htm Cougaar Memory Profiler, http://profiler.cougaar.org.

* cited by examiner

*Primary Examiner*—Etienne P LeRoux
*Assistant Examiner*—Jorge A Casanova
(74) *Attorney, Agent, or Firm*—Martin J. McKinley; Law Office of Jim Boice

(57) ABSTRACT

A method, system and computer-usable medium for attributing memory usage are presented. The method includes the steps of creating an object graph of a portion of a memory heap, wherein the object graph includes nodes that represent objects and associated properties of the objects, and wherein the object graph includes connectors that represent relationships between the objects in the memory heap; observing nodes in one or more subgraphs of the object graph, wherein the nodes represent objects that are selected for observation by a pre-determined criteria; searching for characteristic node properties of nodes that are sampled, from the subgraph, for observation; searching for characteristic topological properties of the subgraph that sampled nodes participate in; and applying a set of pre-determined domain-specific pattern matching filters to the node characteristic properties and the topological characteristic properties to attribute memory usage to a proper software component in a system.

3 Claims, 15 Drawing Sheets

ATTRIBUTING MEMORY USAGE BY INDIVIDUAL SOFTWARE COMPONENTS

BACKGROUND OF THE INVENTION

The present invention relates in general to the field of computers and similar technologies, and in particular to software utilized in this field.

Two major criteria for evaluating software performance are speed and memory usage. Object Oriented Programs (OOPs) such as Java are often evaluated according to these criteria. Measuring speed is relatively easy and straight forward. A software test engineer need only ran a program, and then check the times at which outputs and/or intermediate results are generated. If an intermediate step takes too long to generate a result, then the code that has run up to the intermediate point is evaluated to determine where a bottleneck or other performance restrictor lies.

Measuring the amount of memory used, however, can be much more difficult. State-of-art profilers can at best determine what software objects are consuming the most memory and which methods allocated these objects. Having only this information available is not particularly useful in diagnosing memory performance problems for several reasons. First, knowing which objects are consuming memory often does not help because multiple components in the system allocate similar types of objects. For example, string objects are often major offenders in memory consumption. However, many components in a large software system allocate strings, thus identification of an offending component is difficult. Second, knowing which methods allocated the offending objects often does not help either, since objects can be passed around, making the true source of the problem being other than the creator of the offending object. This is especially true in modern frameworks that utilize factory allocation patterns. Third, tracking allocation of objects imposes a heavy penalty on the runtime performance of the application, making profiling of a large software system impractical.

SUMMARY OF THE INVENTION

To address the problem described above regarding attributing memory usage, a method, system and computer-usable medium are presented. The method includes the steps of creating an object graph of a portion of a memory heap, wherein the object graph includes nodes that represent objects and associated properties of the objects, and wherein the object graph includes connectors that represent relationships between the objects in the memory heap; observing nodes in one or more subgraphs of the object graph, wherein the nodes represent objects that are selected for observation by a pre-determined criteria; searching for characteristic node properties of nodes that are sampled, from the subgraph, for observation; searching for characteristic topological properties of the subgraph that sampled nodes participate in; and applying a set of pre-determined domain-specific pattern matching filters to the node characteristic properties and the topological characteristic properties to attribute memory usage to a proper software component in a system.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

The present invention presents a method, system, and computer-readable medium for attributing space in a memory heap to particular components within a large software system that have objects that are in the memory heap. The objects are sampled, preferably in a snapshot graphical image. This snapshot presents properties of both the objects as well as their topology. Identifying these properties, through the use of filters, allows the identification of a particular component or type of component, thus enabling a computer system to attribute the objects to the particular component or type of component. If a particular component or type of component is determined to be utilizing an excessive amount of space in the memory heap, then an alert is issued, allowing a software administrator to take corrective steps, such as rewriting application code, modifying memory allocation/paging procedures. etc.

In one embodiment, a sampling approach is used to inspect the memory heap. Pattern matching is then applied to sampled objects to look at their connections to other objects in the memory heap, including their paths to any Garbage Collection (GC) roots, in order to determine heuristically the true component in the large software system that is responsible for keeping the object from being garbage collected and freed from the heap.

By using a sampling approach, there is minimal impact to the runtime performance of the application, thus enabling this technique to be used on large software application systems. A pattern matching mechanism can then utilize distinctive patterns that exist in a structured framework (such as Eclipse platform) to accurately determine the component that is responsible for tying up too much memory space. Thus, on an Integrated Development Environment (IDE) such as offered by the Eclipse platform, this mechanism can determine which plug-in application is responsible for (created and uses) the object. Having this information enables a problem solver to quickly identify the application culprit that is causing a performance problem.

Figure 1A:
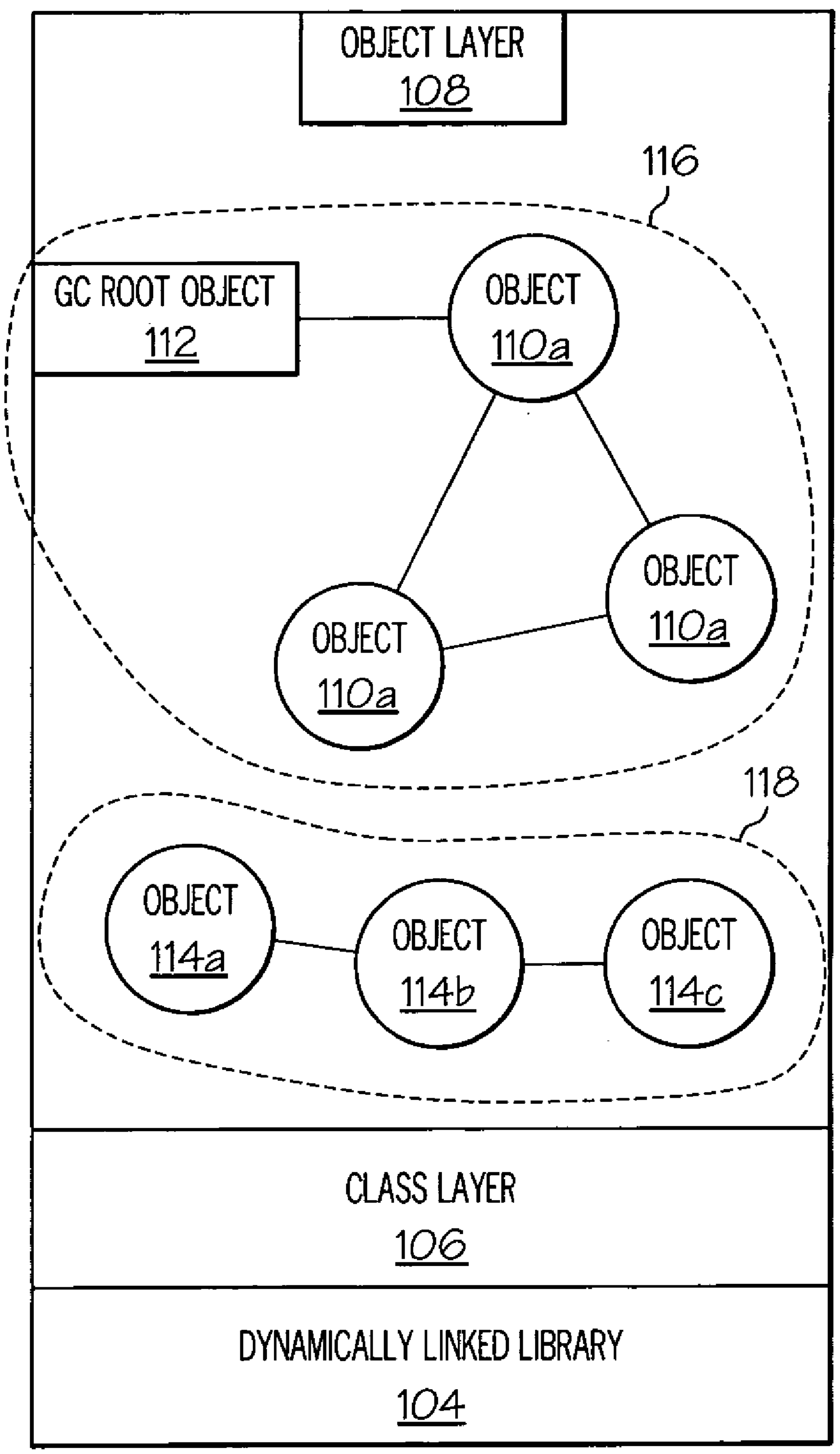
FIGS. 1*a-b* depict a graphical representation of a virtual machine as an operational system process, which includes an object graph of a object layer in a memory heap.

Referring now to the figures and in particular FIG. 1*a*, a process 102 is graphically depicted. Process 102 (which may be in a Java Runtime environment or in a Windows® environment) includes a Dynamically Linked Library (DLL) layer 104, which is linked to application programs when they are loaded or run, thus allowing the same block of library code to be shared among tasks. Above DLL layer 104 is a class layer 106, which contains object classes, which can be instantiated into objects such as those shown in object layer 108. Object layer 108 includes multiple objects 110, which may be linked with a Garbage Collector (GC) root object 112. GC root object 112 is the root code for garbage collection in a memory heap. As the term implies, garbage collection searches for objects that are no longer useful (are no longer being pointed to or called, and thus are unreachable), marks them as being "garbage," and then sweeps out any garbage objects, thus freeing up the memory space previously taken up by the garbage objects.

Figure 1B:
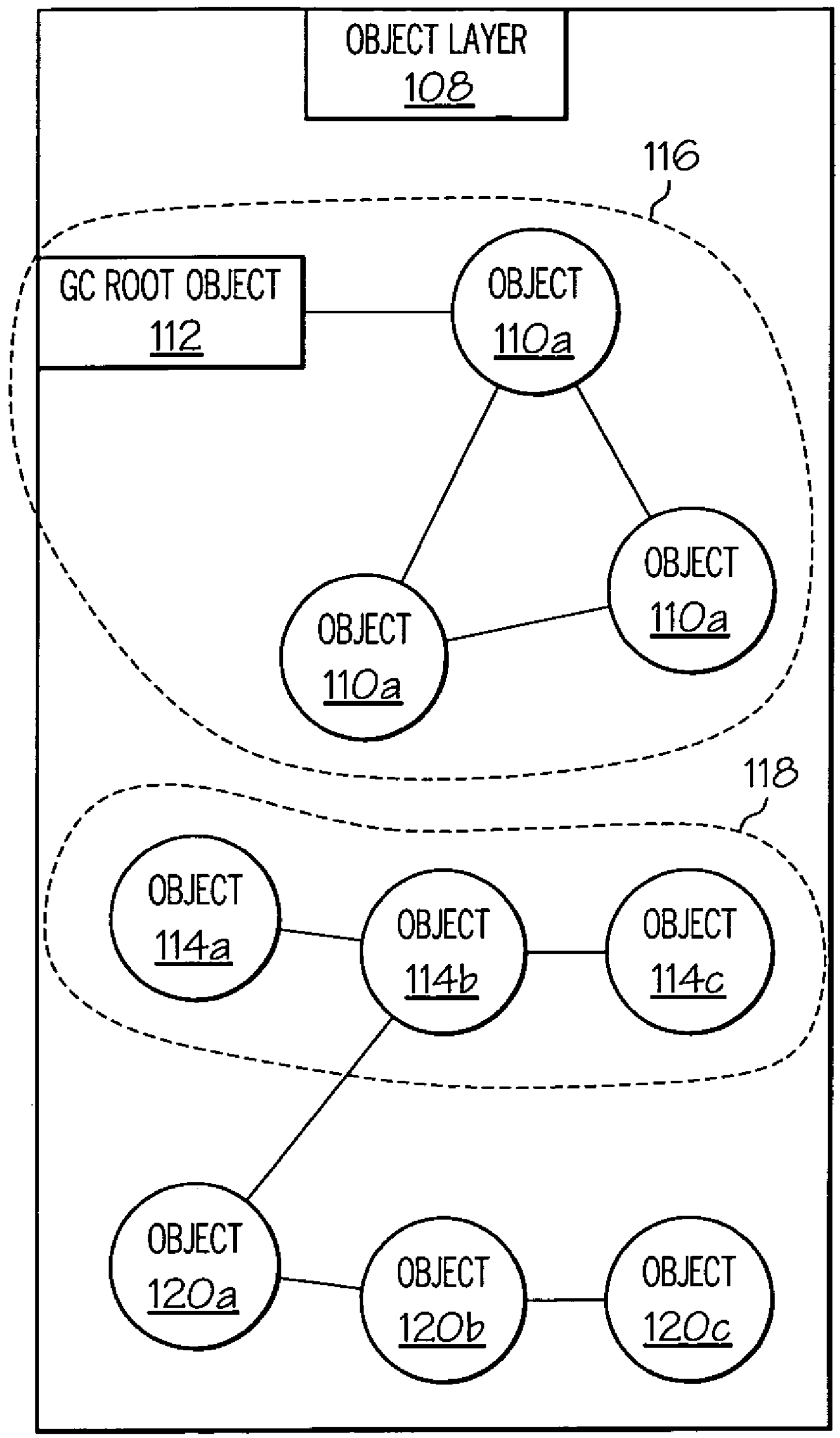

Also within the object layer 108 are objects 114*a-c*, which are no longer useful ("live") objects. Although objects 114 are no longer useful, they may still be inadvertently linked to GC root object 112, thus causing memory leakage (wasted space). This problem may be further compounded by additional objects 120*a-c*, shown in FIG. 1*b*, which are linked to one or more of the objects 114, and thus are likewise out of range for location and identification by a Garbage Collection (GC) routine. Note that GC root object 112, despite its name, is by definition not garbage, and thus is kept in memory after a garbage collection sweep.

In an exemplary embodiment of the present invention, the graphical representations of objects and their inter-relationships in object layer 108 in a memory heap may be captured in a snapshot (while preferably allowing all live objects to continue to be executable). A sample of the objects, such as subgraph 116 or subgraph 118, is then selected for analysis. For each of the objects selected in the sample, the following information is obtained about that object. First, the true footprint (amount of memory used) in the memory heap is determined. This footprint is often larger than the size of the object itself since other objects may be referenced by this object, and thus prevented from garbage collection. This information can be computed by obtaining information about the connection from the sampled object 110 or 114 to other objects on the stack (objects in the object layer 108 of the process 102). Additional information can be gleaned by connections between objects 110, between objects 114, and/or between an object 114 and an object 120.

Figure 2:
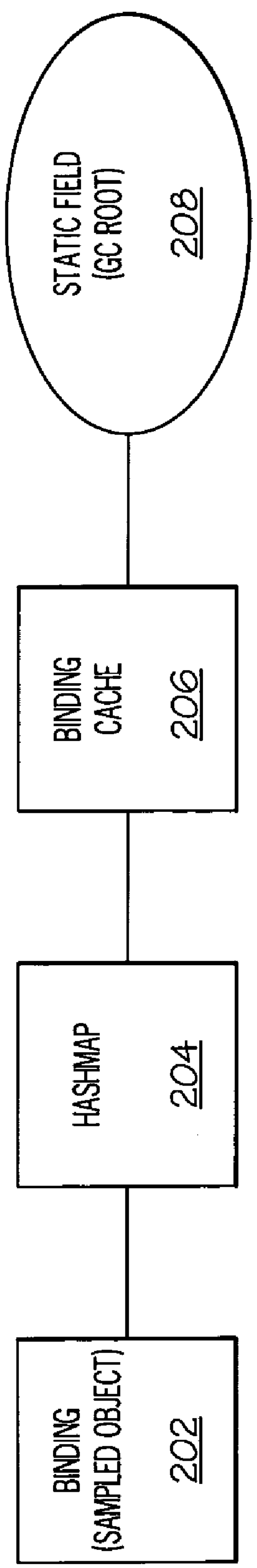
FIG. 2 illustrates an exemplary pathway to an observed node in the memory heap.

An example of an object that is sampled for evaluation (from a snapshot of a subgraph from a memory heap) is shown in FIG. 2, which depicts characteristics of nodes and connections in a pathway to a sampled object. Consider the sampled object 202, which may be, for illustrative purposes, a binding object (capable of referencing another larger and more complicated object or set of objects). Sampled object 202 is graphically depicted as linked to a HashMap 204. HashMap 204 is a data structure that associates keys (e.g., a person's name) with a corresponding value (e.g., the person's social security number) through the use of a hashcode. Being a standard collections class, HashMap 204 is not responsible for holding on to the binding object (sampled object 202). HashMap 204 is connected to a BindingCache 206, which is a cache listing of looked-up values. By looking at the connections arising from BindingCache 206 to HashMap 204, it can be concluded that BindingCache 206 is in fact a cache in the system. BindingCache 206 is connected to the static field GC root 208. Being a static field, it is assumed that GC root 208 is a field of a class in a particular plug-in in an application. By identifying the different characteristics with appropriate filters, and then combining the filtered characteristics, it can be concluded that a certain type of plug-in is utilizing the objects in the examined subgraph, and thus uses a cache of bindings in the system (and stored in the memory heap). With this knowledge, a determination can now be made as to how much total memory is actually consumed by this plug-in, including the cache and related objects.

Note that the kinds of patterns that can be applied are not limited to that described with reference to FIG. 2, which is presented for exemplary purposes. Rather, a user can determine a custom set of patterns to be applied to obtain information that is deemed relevant. Furthermore, information obtained through such analysis can be presented in a variety of fashions, including but not limited to a running graph showing memory consumption and the true source (i.e., an object, cache, application) of the memory consumption.

Figure 3:
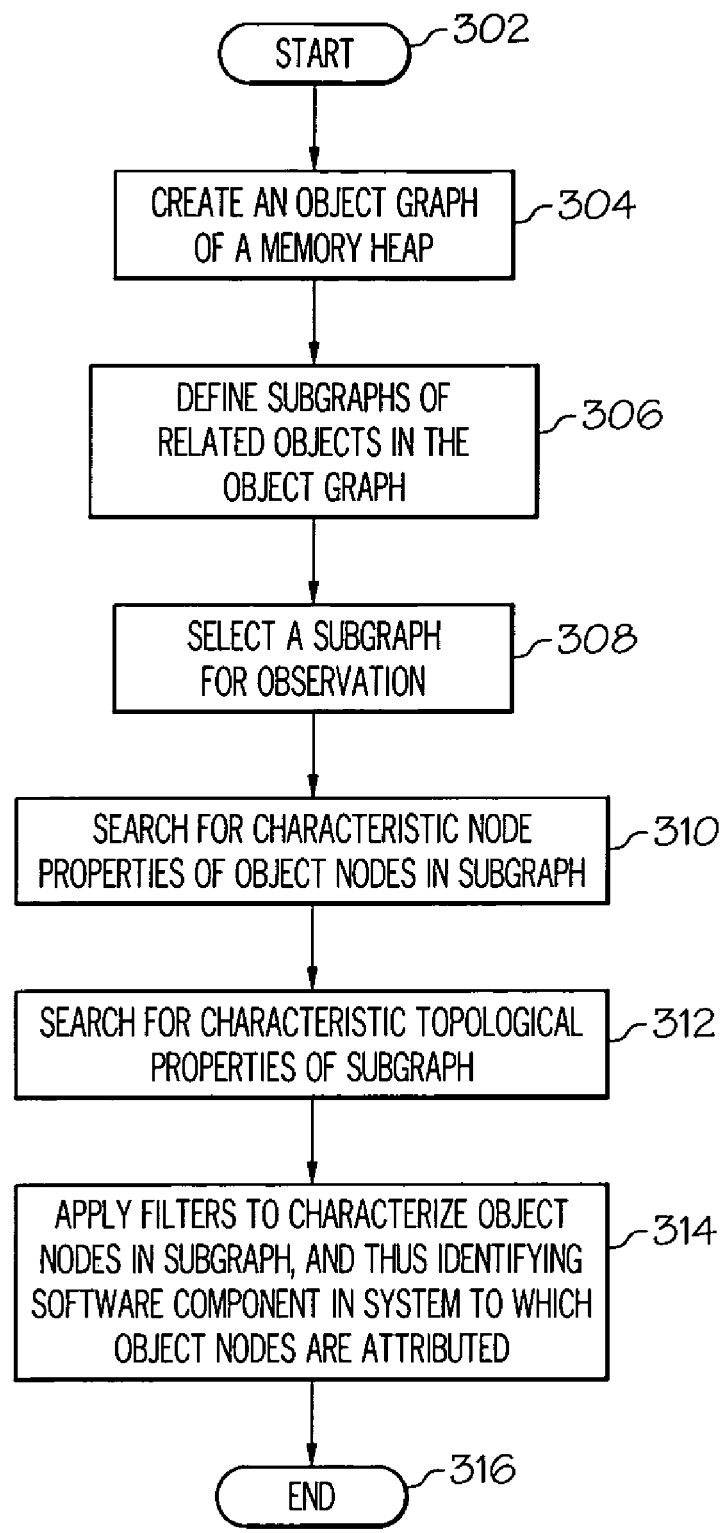
FIG. 3 is a flow-chart of exemplary steps taken to attribute memory usage by objects in a memory heap to a particular application or type of application.

With reference now to FIG. 3, a flow-chart of exemplary steps taken in the present invention is presented. After initiator block 302, an object graph of a memory heap is created (block 304). This object graph includes not only nodes representing objects, but connectors showing relationships and actions taken between object nodes. Next, a subgraph of related object in the object graph is defined, as described in block 306, and shown in exemplary manner in FIG. 1*a* as subgraphs 116 and 118. A subgraph is selected for observation (block 308), and characteristic node properties for object nodes in the selected subgraph are searched for (block 310). Furthermore, characteristic topological properties (relationships such as parent/child relationships, action stereotypes describing actions taken to run/call/execute one object by another, etc.) are searched for (block 312). One or more filters are applied to the searched subgraphs to characterize the nature of the object nodes and their connectors in the subgraph, thus enabling the identification of a software component in the system to which the object nodes are attributed (block 314). With this information in hand, system performance can be enhanced by reducing the impact of memory gluttons. The process ends at terminator block 316.

Figure 4:
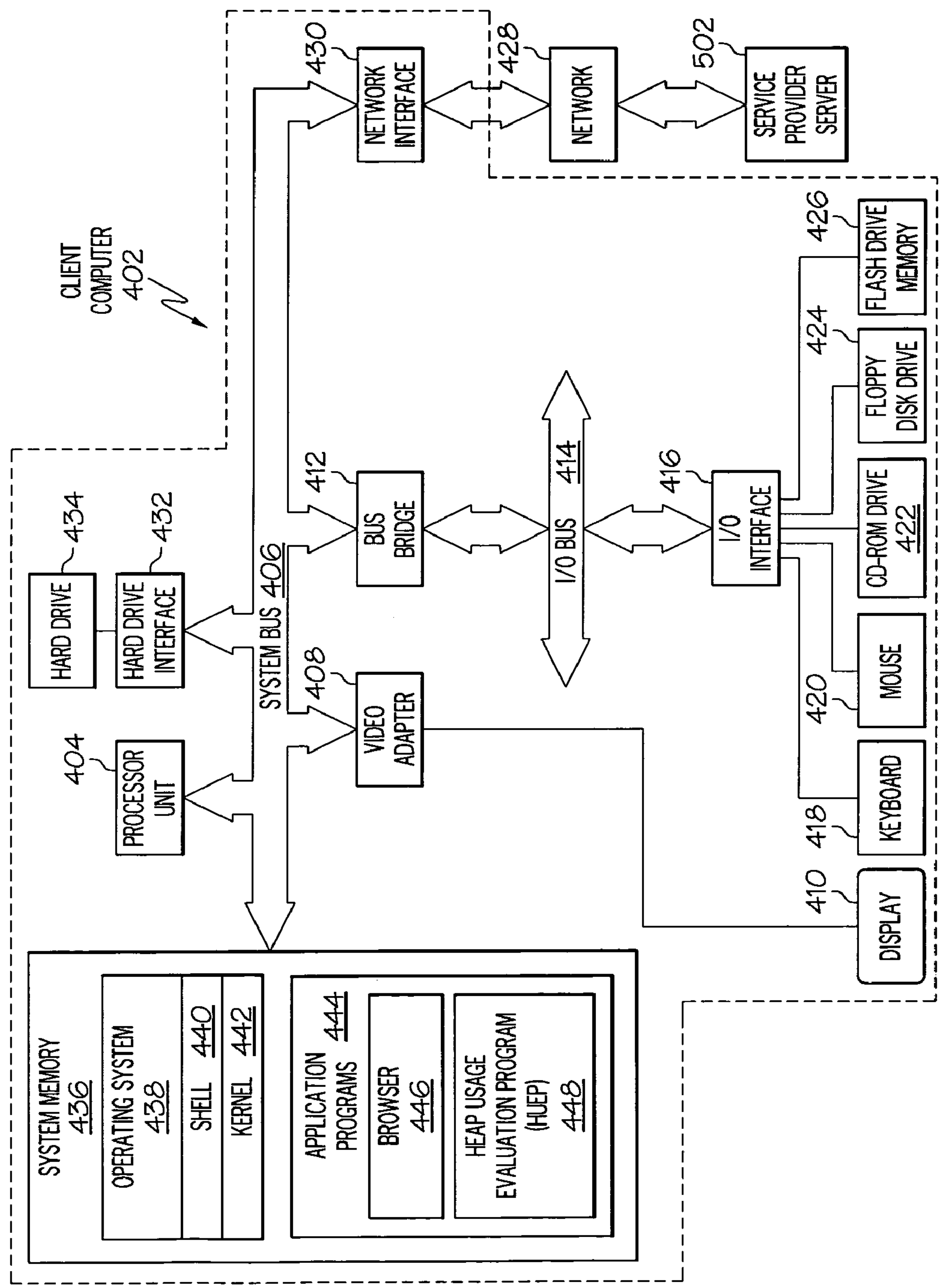
FIG. 4 depicts an exemplary client computer in which the present invention may be implemented.

With reference now to FIG. 4, there is depicted a block diagram of an exemplary client computer 402, in which the present invention may be utilized. Client computer 402 includes a processor unit 404 that is coupled to a system bus 406. A video adapter 408, which drives/supports a display 410, is also coupled to system bus 406. System bus 406 is coupled via a bus bridge 412 to an Input/Output (I/O) bus 414. An I/O interface 416 is coupled to I/O bus 414. I/O interface 416 affords communication with various I/O devices, including a keyboard 418, a mouse 420, a Compact Disk-Read Only Memory (CD-ROM) drive 422, a floppy disk drive 424, and a flash drive memory 426. The format of the ports connected to I/O interface 416 may be any known to those skilled in the art of computer architecture, including but not limited to Universal Serial Bus (USB) ports.

Client computer 402 is able to communicate with a service provider server 502 via a network 428 using a network interface 430, which is coupled to system bus 406. Network 428 may be an external network such as the Internet, or an internal network such as an Ethernet or a Virtual Private Network (VPN). Using network 428, client computer 402 is able to use the present invention to access service provider server 502.

A hard drive interface 432 is also coupled to system bus 406. Hard drive interface 432 interfaces with a hard drive 434. In a preferred embodiment, hard drive 434 populates a system memory 436, which is also coupled to system bus 406. Data that populates system memory 436 includes client computer 402's operating system (OS) 438 and application programs 444.

OS 438 includes a shell 440, for providing transparent user access to resources such as application programs 444. Generally, shell 440 is a program that provides an interpreter and an interface between the user and the operating system. More specifically, shell 440 executes commands that are entered into a command line user interface or from a file. Thus, shell 440 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 442) for processing. Note that while shell 440 is a text-based, line-oriented user interface, the present invention will equally well support other user interface modes, such as graphical, voice, gestural, etc.

As depicted, OS 438 also includes kernel 442, which includes lower levels of functionality for OS 438, including providing essential services required by other parts of OS 438 and application programs 444, including memory management, process and task management, disk management, and mouse and keyboard management.

Application programs 444 include a browser 446. Browser 446 includes program modules and instructions enabling a World Wide Web (WWW) client (i.e., client computer 402) to send and receive network messages to the Internet using HyperText Transfer Protocol (HTTP) messaging, thus enabling communication with service provider server 502.

Application programs 444 in client computer 402's system memory also include a Heap Usage Evaluation Program (HUEP) 448. HUEP 448 includes code for implementing the processes described in FIGS. 1*a*-3. In one embodiment, client computer 402 is able to download HUEP 448 from service provider server 502.

The hardware elements depicted in client computer 402 are not intended to be exhaustive, but rather are representative to highlight essential components required by the present invention. For instance, client computer 402 may include alternate memory storage devices such as magnetic cassettes, Digital Versatile Disks (DVDs), Bernoulli cartridges, and the like. These and other variations are intended to be within the spirit and scope of the present invention.

Figure 5:
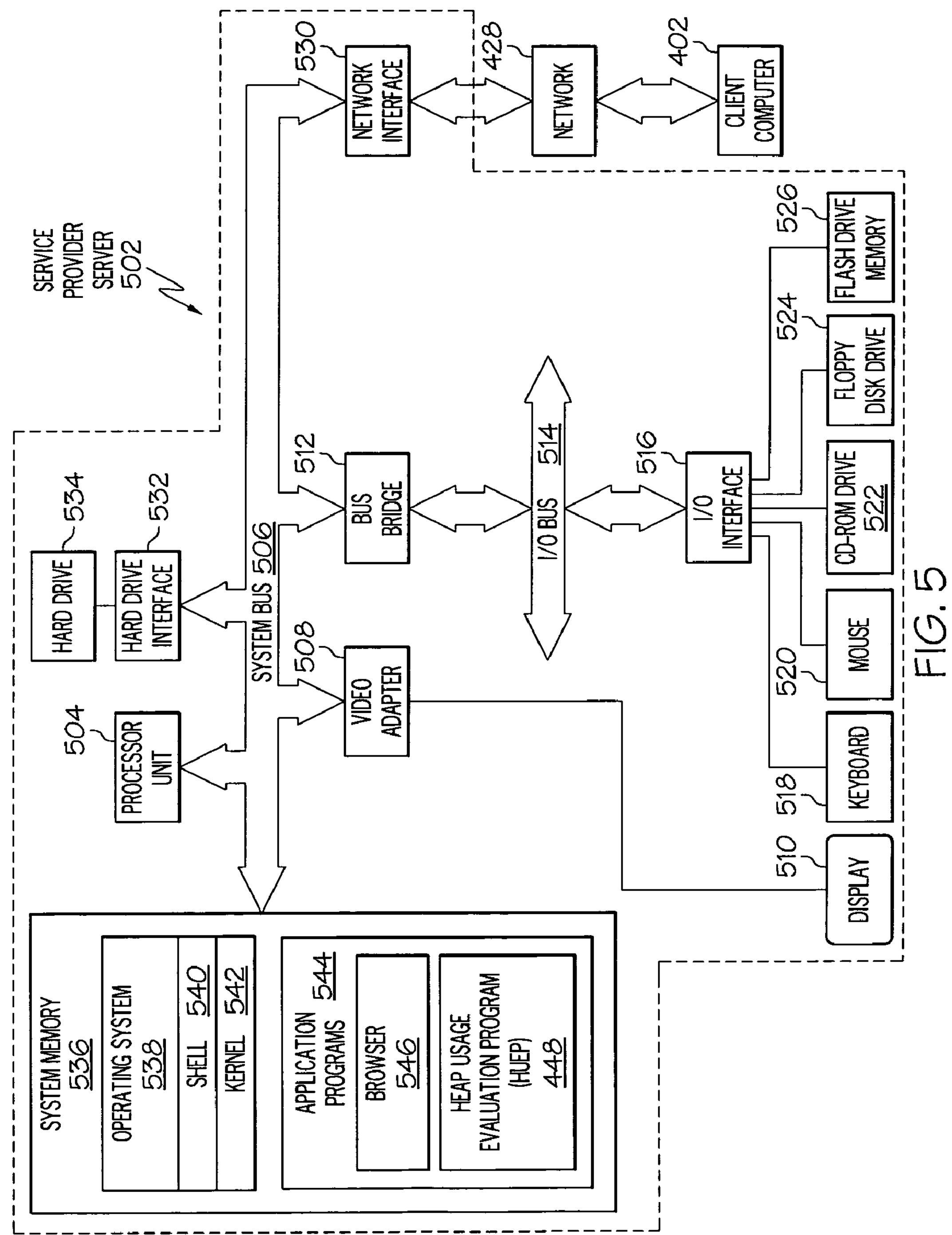
FIG. 5 illustrates an exemplary server from which software for executing the present invention may be deployed and/or implemented for the benefit of a user of the client computer shown in FIG. 4.

As noted above, HUEP 448 can be downloaded to client computer 402 from service provider server 502, shown in exemplary form in FIG. 5. Service provider server 502 includes a processor unit 504 that is coupled to a system bus 506. A video adapter 508 is also coupled to system bus 506. Video adapter 508 drives/supports a display 510. System bus 506 is coupled via a bus bridge 512 to an Input/Output (I/O) bus 514. An I/O interface 516 is coupled to I/O bus 514. I/O interface 516 affords communication with various I/O devices, including a keyboard 518, a mouse 520, a Compact Disk-Read Only Memory (CD-ROM) drive 522, a floppy disk drive 524, and a flash drive memory 526. The format of the ports connected to I/O interface 516 may be any known to those skilled in the art of computer architecture, including but not limited to Universal Serial Bus (USB) ports.

Service provider server 502 is able to communicate with client computer 402 via network 428 using a network interface 530, which is coupled to system bus 506. Access to network 428 allows service provider server 502 to execute and/or download HUEP 448 to client computer 402.

System bus 506 is also coupled to a hard drive interface 532, which interfaces with a hard drive 534. In a preferred embodiment, hard drive 534 populates a system memory 536, which is also coupled to system bus 506. Data that populates system memory 536 includes service provider server 502's operating system 538, which includes a shell 540 and a kernel 542. Shell 540 is incorporated in a higher level operating system layer and utilized for providing transparent user access to resources such as application programs 544, which include a browser 546, and a copy of HUEP 448 described above, which can be deployed to client computer 402.

The hardware elements depicted in service provider server 502 are not intended to be exhaustive, but rather are representative to highlight essential components required by the present invention. For instance, service provider server 502 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, service provider server 502 performs all of the functions associated with the present invention (including execution of HUEP 448), thus freeing client computer 402 from using its resources.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of HUEP 448, are performed by service provider server 502. Alternatively, HUEP 448 and the method described herein, and in particular as shown and described in FIGS. 1*a*-3, can be deployed as a process software from service provider server 502 to client computer 402. Still more particularly, process software for the method so described may be deployed to service provider server 502 by another service provider server (not shown).

Figure 6A:
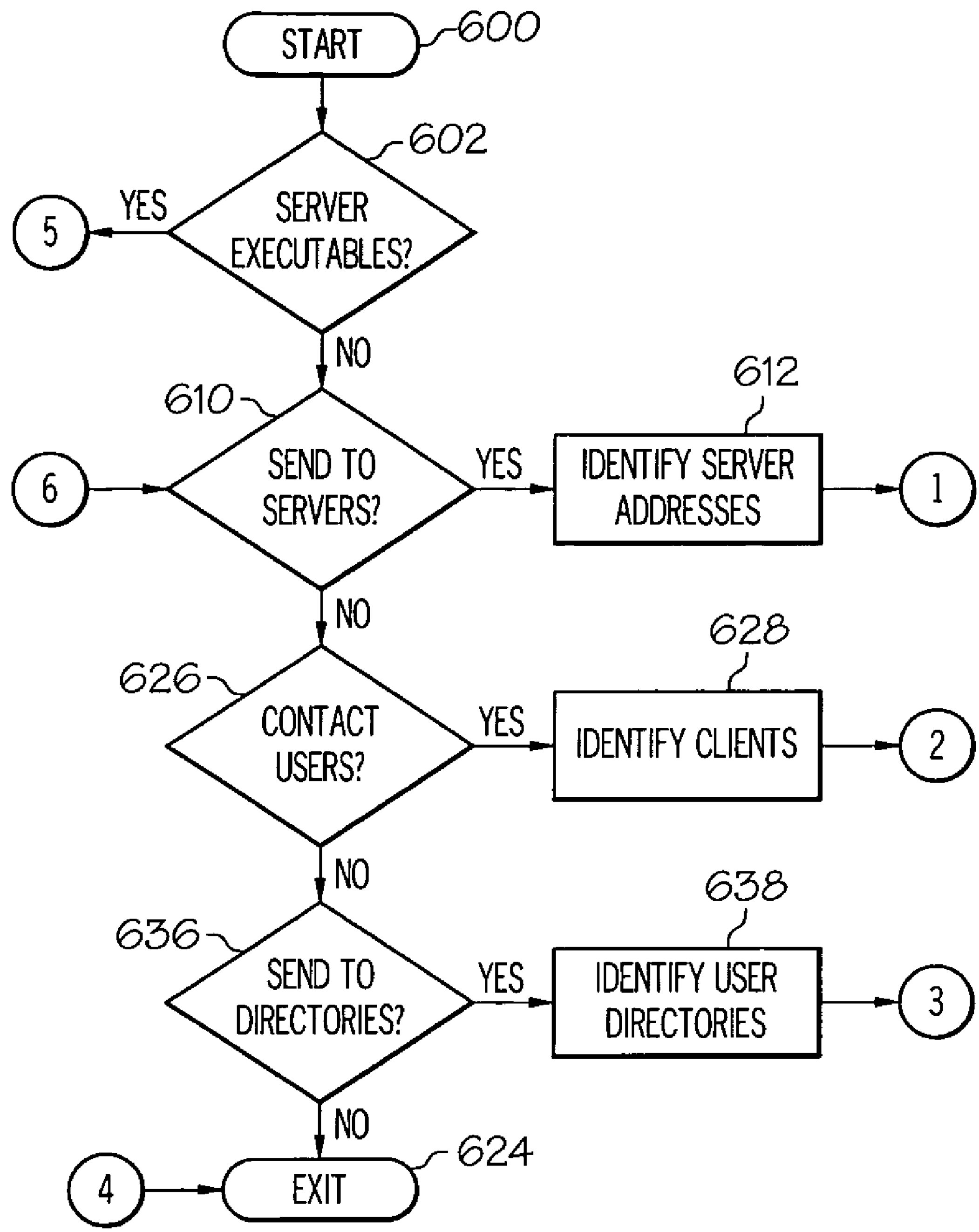
FIGS. 6*a-b* show a flow-chart of steps taken to deploy software capable of executing the steps shown and described in FIGS. 1*a*-3.
Figure 6B:
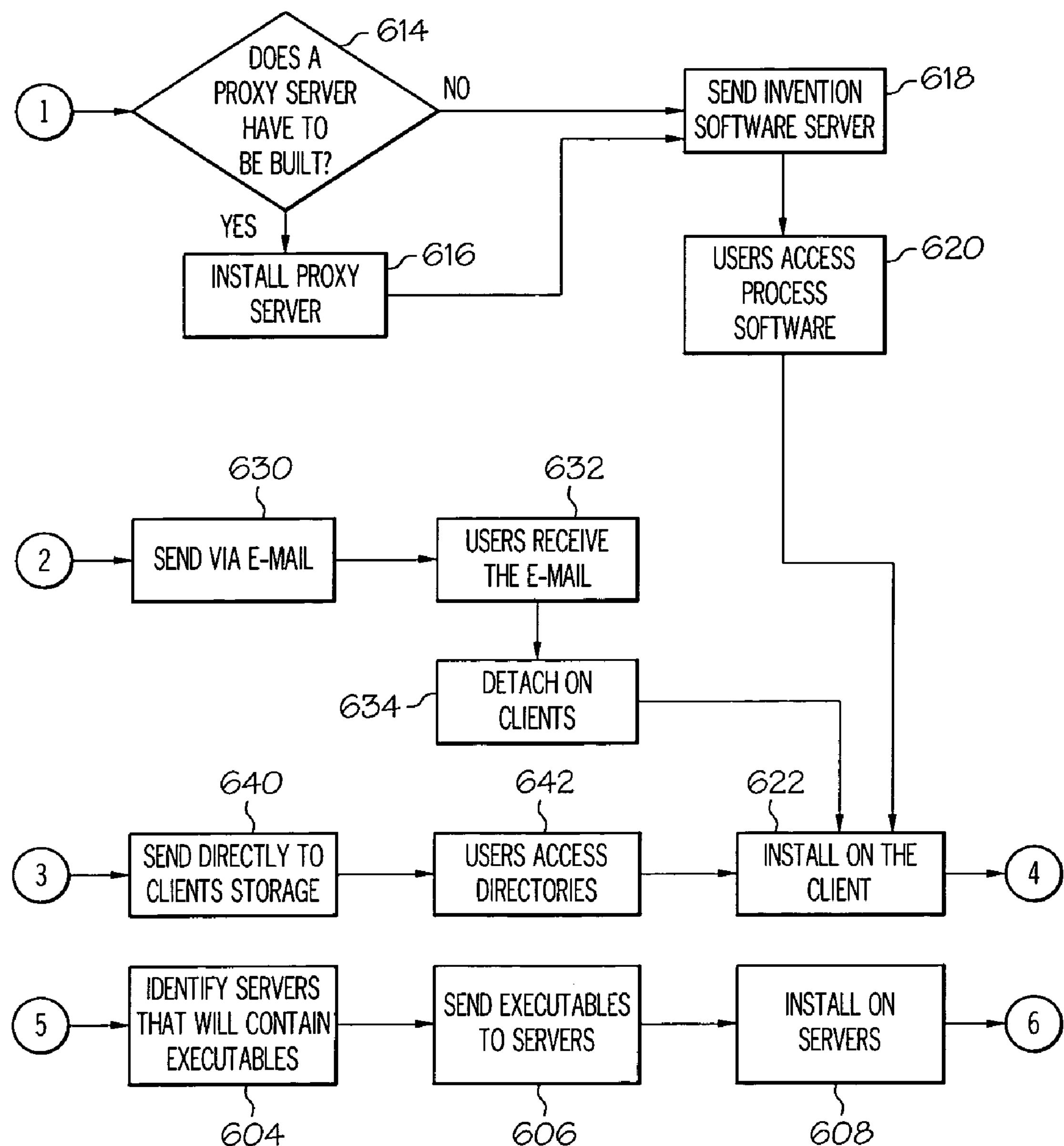

Referring then to FIGS. 6*a*-*b*, step 600 begins the deployment of the process software. The first thing is to determine if there are any programs that will reside on a server or servers when the process software is executed (query block 602). If this is the case, then the servers that will contain the executables are identified (block 604). The process software for the server or servers is transferred directly to the servers' storage via File Transfer Protocol (FTP) or some other protocol or by copying though the use of a shared file system (block 606). The process software is then installed on the servers (block 608).

Next, a determination is made on whether the process software is to be deployed by having users access the process software on a server or servers (query block 610). If the users are to access the process software on servers, then the server addresses that will store the process software are identified (block 612).

A determination is made if a proxy server is to be built (query block 614) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 616). The process software is sent to the servers either via a protocol such as FTP or it is copied directly from the source files to the server files via file sharing (block 618). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 620). Another embodiment is to have the servers automatically copy the process software to each client and then run the installation program for the process software at each client computer. The user executes the program that installs the process software on his client computer (block 622) then exits the process (terminator block 624).

In query step 626, a determination is made whether the process software is to be deployed by sending the process software to users via e-mail. The set of users where the process software will be deployed are identified together with the addresses of the user client computers (block 628). The process software is sent via e-mail to each of the users' client computers (block 630). The users then receive the e-mail (block 632) and then detach the process software from the e-mail to a directory on their client computers (block 634). The user executes the program that installs the process software on his client computer (block 622) then exits the process (terminator block 624).

Lastly a determination is made on whether the process software will be sent directly to user directories on their client computers (query block 636). If so, the user directories are identified (block 638). The process software is transferred directly to the user's client computer directory (block 640). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 642). The user executes the program that installs the process software on his client computer (block 622) and then exits the process (terminator block 624).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packer and sending it over a network. The protocol of the outer packet is understood by the network and both points, called tunnel interfaces, where the packet enters and exits the network.

Figure 7A:
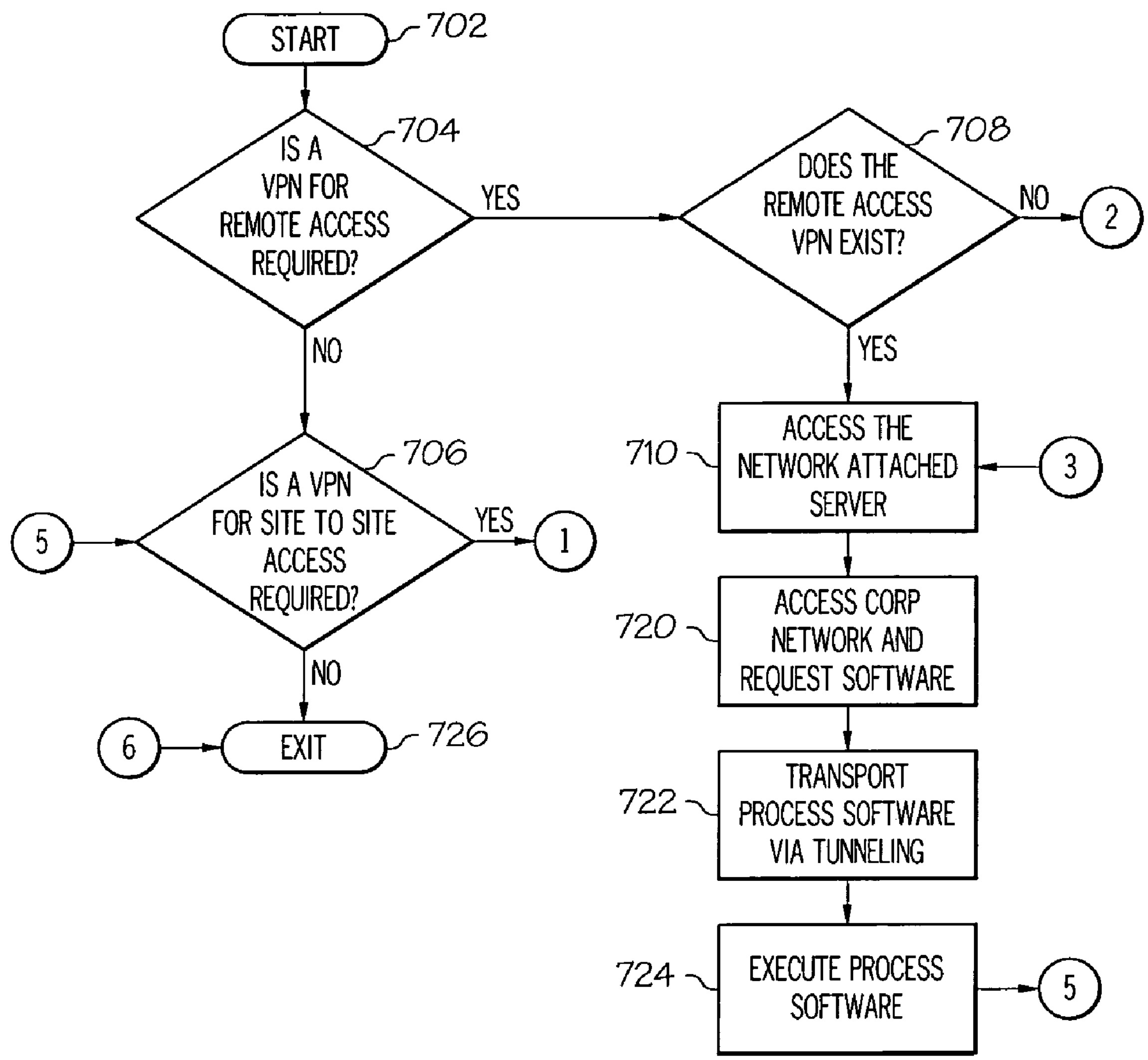
FIGS. 7*a-c* show a flow-chart of steps taken to deploy in a Virtual Private Network (VPN) software that is capable of executing the steps shown and described in FIGS. 1*a*-3.
Figure 7B:
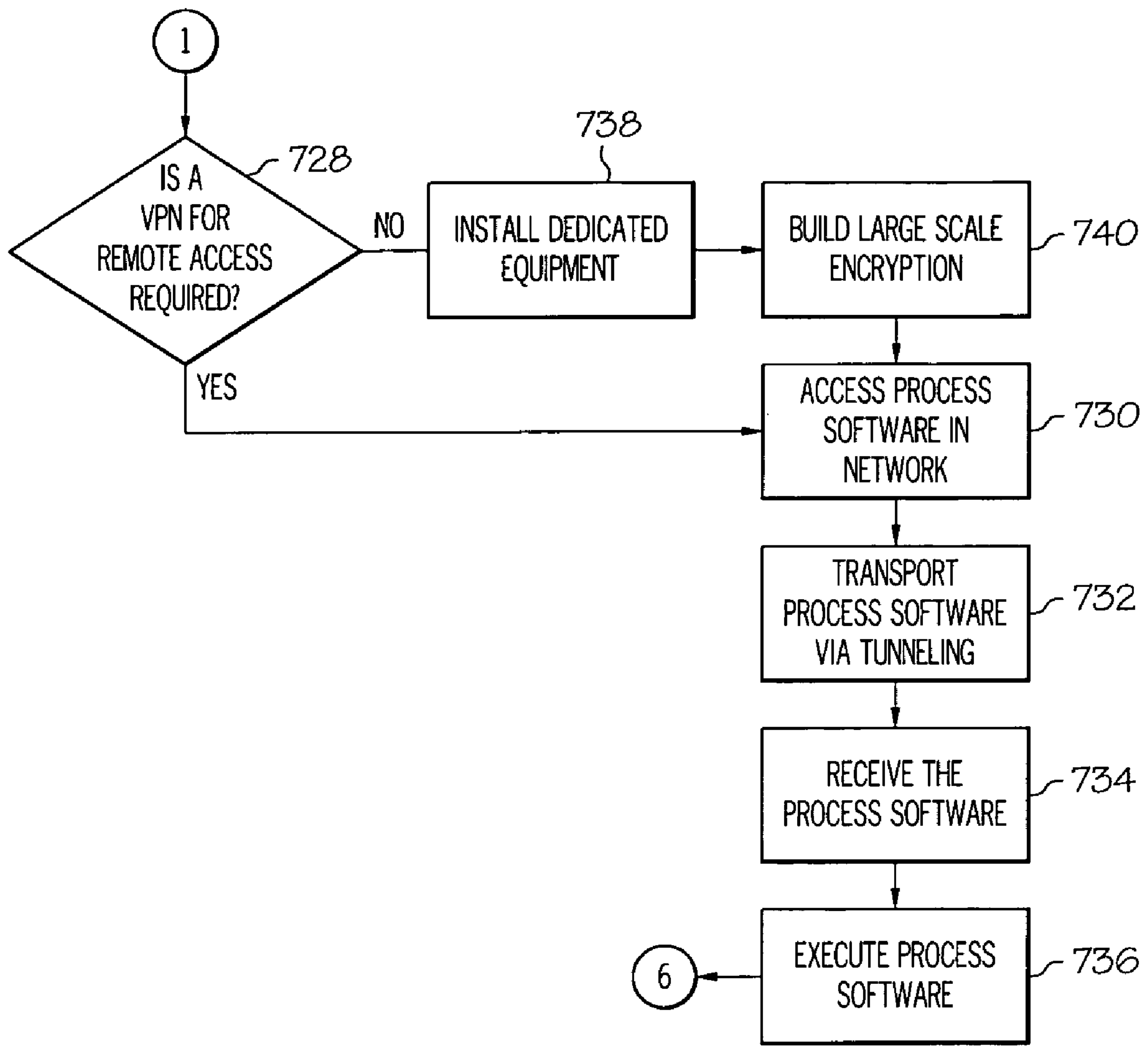
Figure 7C:
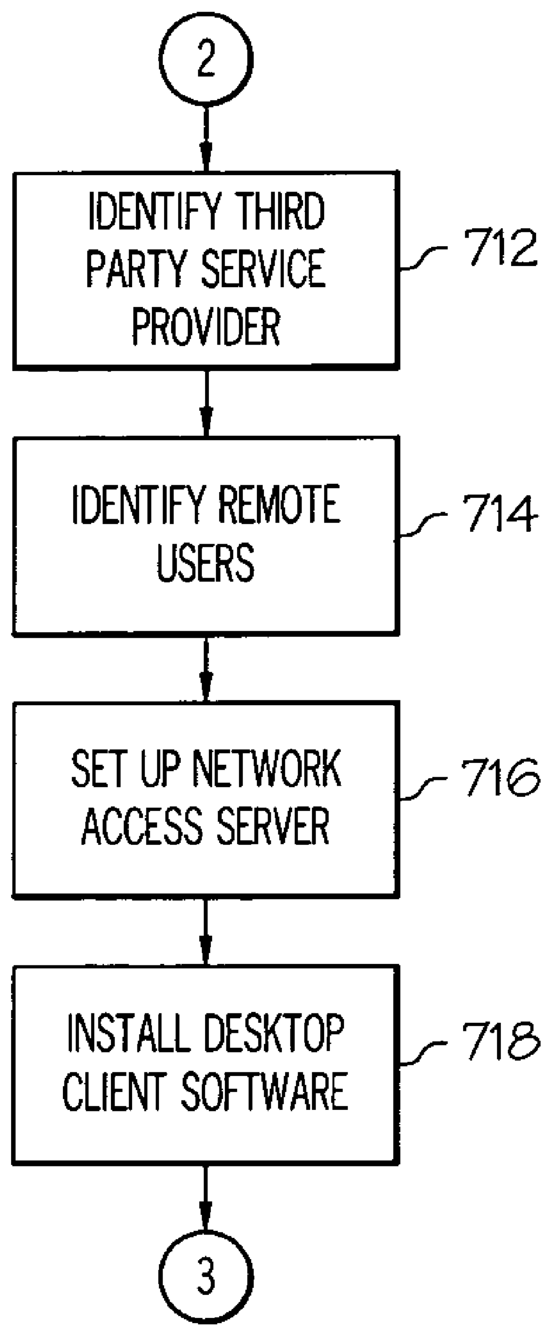

The process for such VPN deployment is described in FIGS. 7*a-c*. Initiator block 702 begins the Virtual Private Network (VPN) process. A determination is made to see if a VPN for remote access is required (query block 704). If it is not required, then proceed to (query block 706). If it is required, then determine if the remote access VPN exists (query block 708).

If a VPN does exist, then proceed to block 710. Otherwise identify a third party provider that will provide the secure, encrypted connections between the company's private network and the company's remote users (block 712). The company's remote users are identified (block 714). The third party provider then sets up a network access server (NAS) (block 716) that allows the remote users to dial a toll free number or attach directly via a broadband modem to access, download and install the desktop client software for the remote-access VPN (block 718).

After the remote access VPN has been built or if it been previously installed, the remote users can access the process software by dialing into the NAS or attaching directly via a cable or DSL modem into the NAS (block 710). This allows entry into the corporate network where the process software is accessed (block 720). The process software is transported to the remote user's desktop over the network via tunneling. That is the process software is divided into packets and each packet including the data and protocol is placed within another packet (block 722). When the process software arrives at the remote user's desktop, it is removed from the packets, reconstituted and then is executed on the remote users desktop (block 724).

A determination is then made to see if a VPN for site to site access is required (query block 706). If it is not required, then proceed to exit the process (terminator block 726). Otherwise, determine if the site to site VPN exists (query block 728). If it does exist, then proceed to block 730. Otherwise, install the dedicated equipment required to establish a site to site VPN (block 738). Then build the large scale encryption into the VPN (block 740).

After the site to site VPN has been built or if it had been previously established, the users access the process software via the VPN (block 730). The process software is transported to the site users over the network via tunneling (block 732). That is the process software is divided into packets and each packet including the data and protocol is placed within another packet (block 734). When the process software arrives at the remote user's desktop, it is removed from the packets, reconstituted and is executed on the site users desktop (block 736). The process then ends at terminator block 726.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 8A:
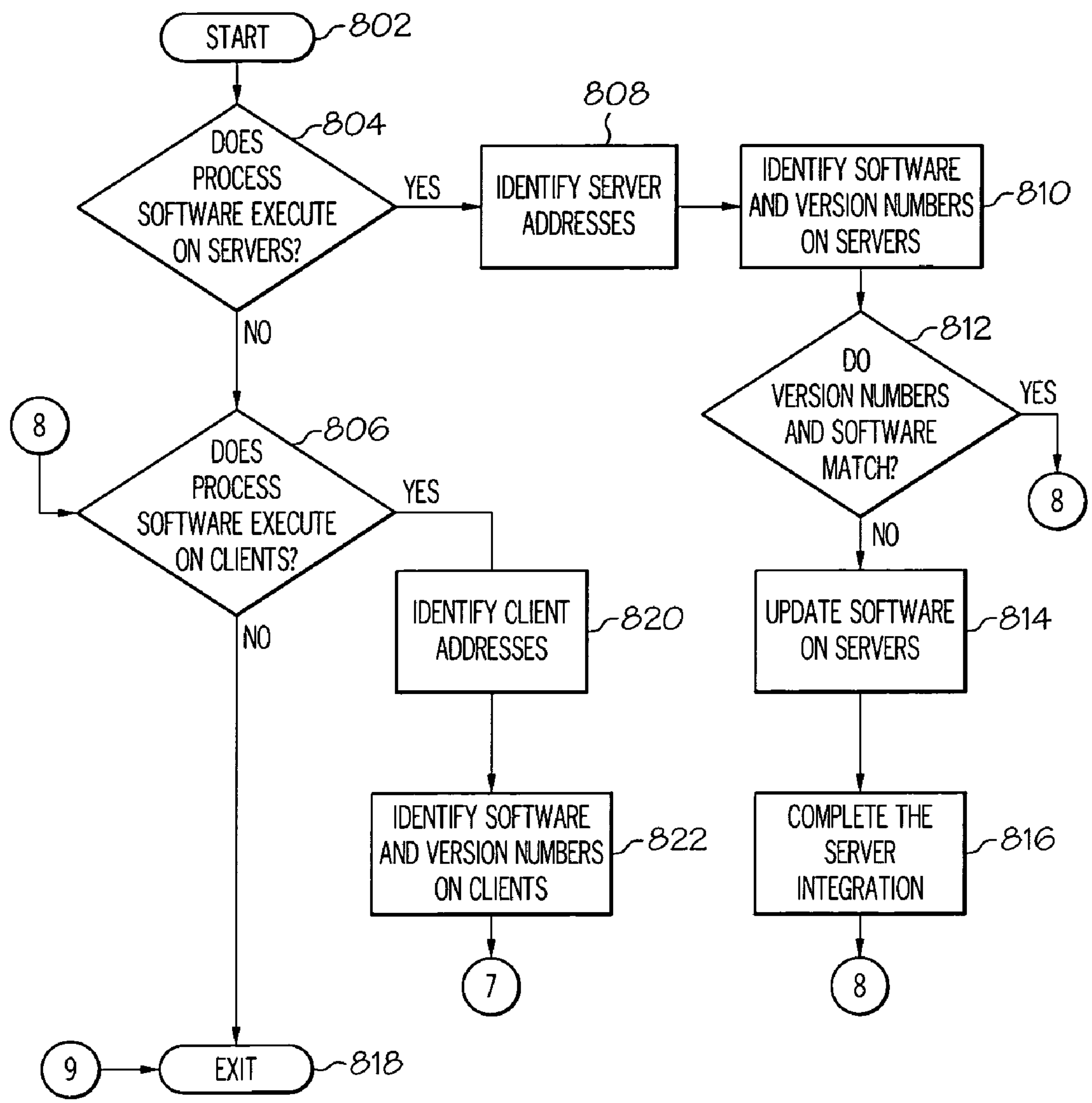
FIGS. 8*a-b* show a flow-chart showing steps taken to integrate into a computer system software that is capable of executing the steps shown and described in FIGS. 1*a*-3.
Figure 8B:
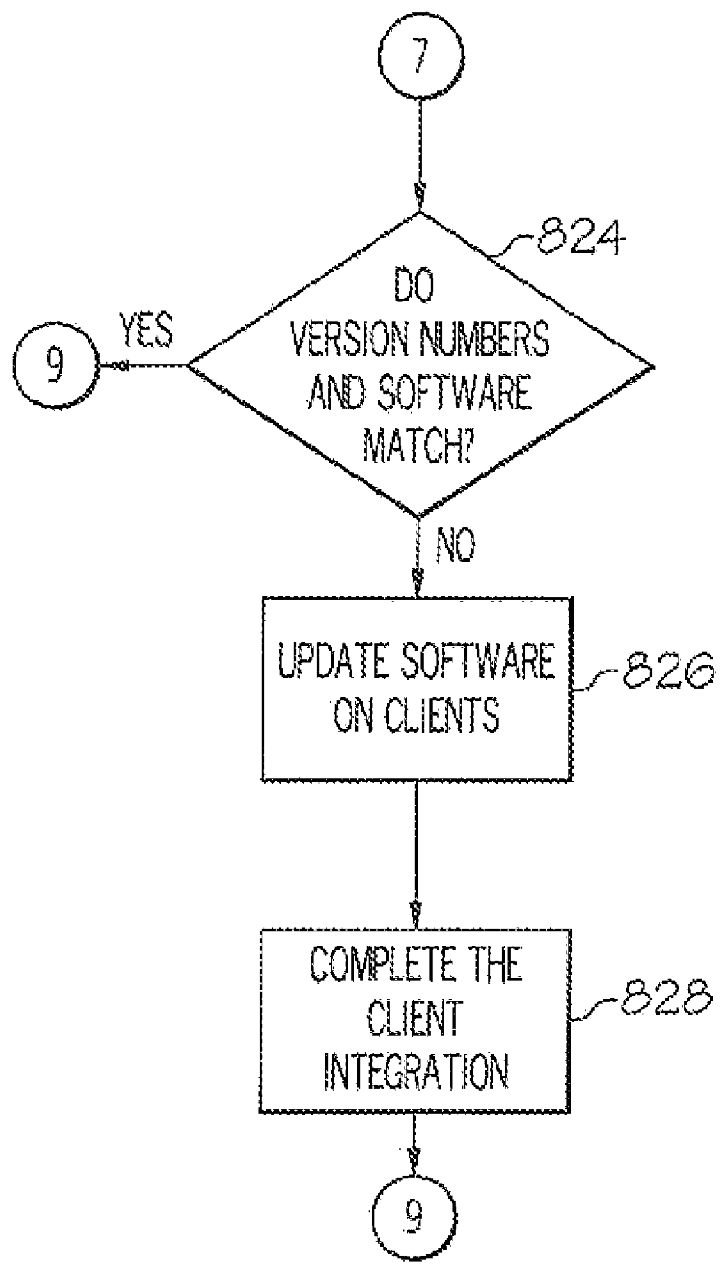

For a high-level description of this process, reference is now made to FIGS. 8*a-b*. Initiator block 802 begins the integration of the process software. The first tiling is to determine if there are any process software programs that will execute on a server or servers (block 804). If this is not the case, then integration proceeds to query block 806. If this is the case, then the server addresses are identified (block 808). The servers are checked to see if they contain software that includes the operating system (OS), applications, and network operating systems (NOS), together with their version numbers, which have been tested with the process software (block 810). The servers are also checked to determine if there is any missing software that is required by the process software in block 810.

A determination is made if the version numbers match the version numbers of OS, applications and NOS that have been tested with the process software (block 812). If all of the versions match and there is no missing required software the integration continues in query block 806.

If one or more of the version numbers do not match, then the unmatched versions are updated on the server or servers with the correct versions (block 814). Additionally, if there is missing required software, then it is updated on the server or servers in the step shown in block 814. The server integration is completed by installing the process software (block 816).

The step shown in query block 806, which follows either the steps shown in block 804, 812 or 816 determines if there are any programs of the process software that will execute on the clients. If no process software programs execute on the clients the integration proceeds to terminator block 818 and exits. If this not the case, then the client addresses are identified as shown in block 820.

The clients are checked to see if they contain software that includes the operating system (OS), applications, and network operating systems (NOS), together with their version numbers, which have been tested with the process software (block 822). The clients are also checked to determine if there is any missing software that is required by the process software in the step described by block 822.

A determination is made if the version numbers match the version numbers of OS, applications and NOS that have been tested with the process software (query block 824). If all of the versions match and there is no missing required software, then the integration proceeds to terminator block 818 and exits.

If one or more of the version numbers do not match, then the unmatched versions are updated on the clients with the correct versions (block 826). In addition, if there is missing required software then it is updated on the clients (also block 826). The client integration is completed by installing the process software on the clients (block 828). The integration proceeds to terminator block 818 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 9A:
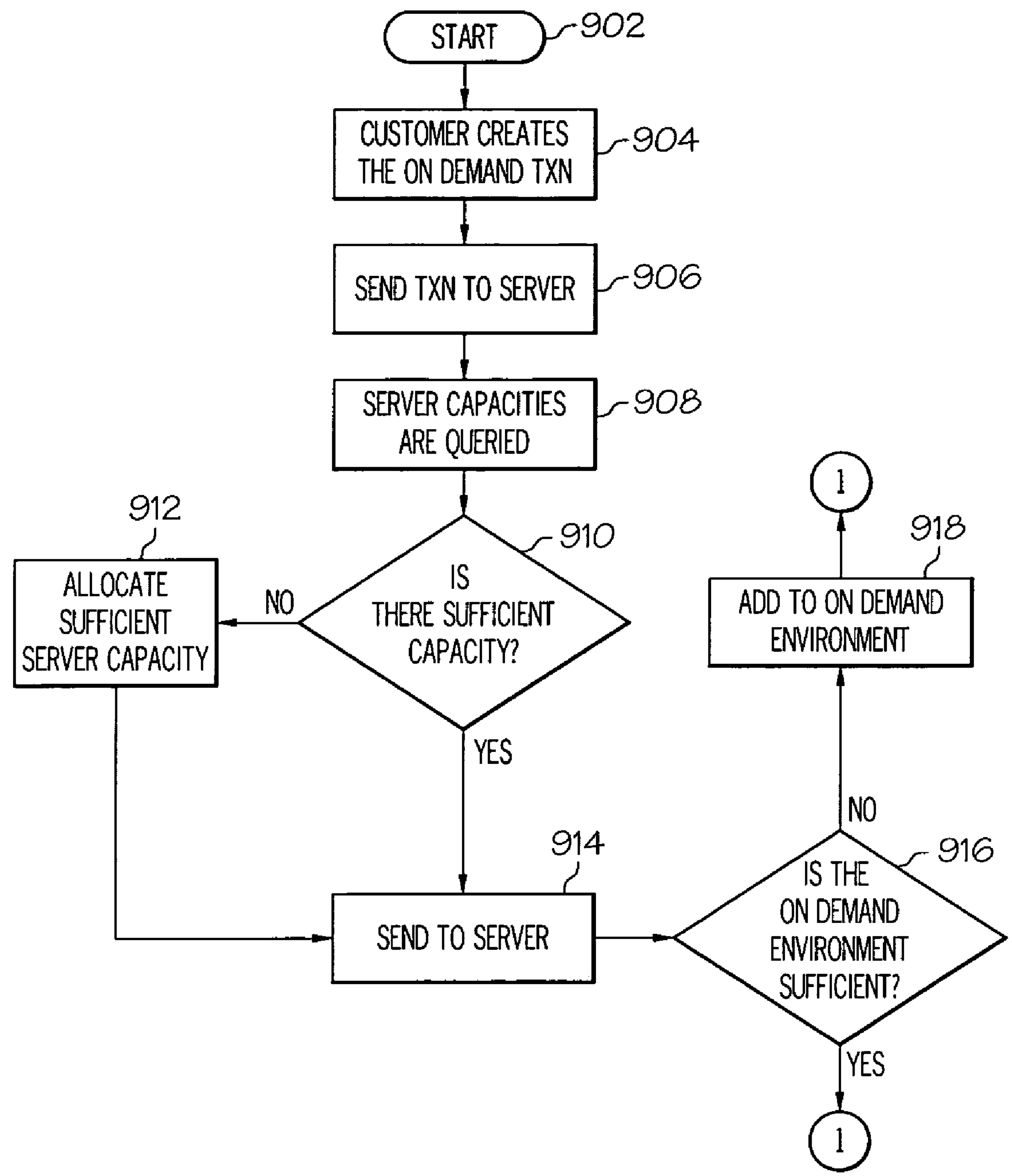
FIGS. 9*a-b* show a flow-chart showing steps taken to execute the steps shown and described in FIGS. 1*a*-3 using an on-demand service provider.
Figure 9B:
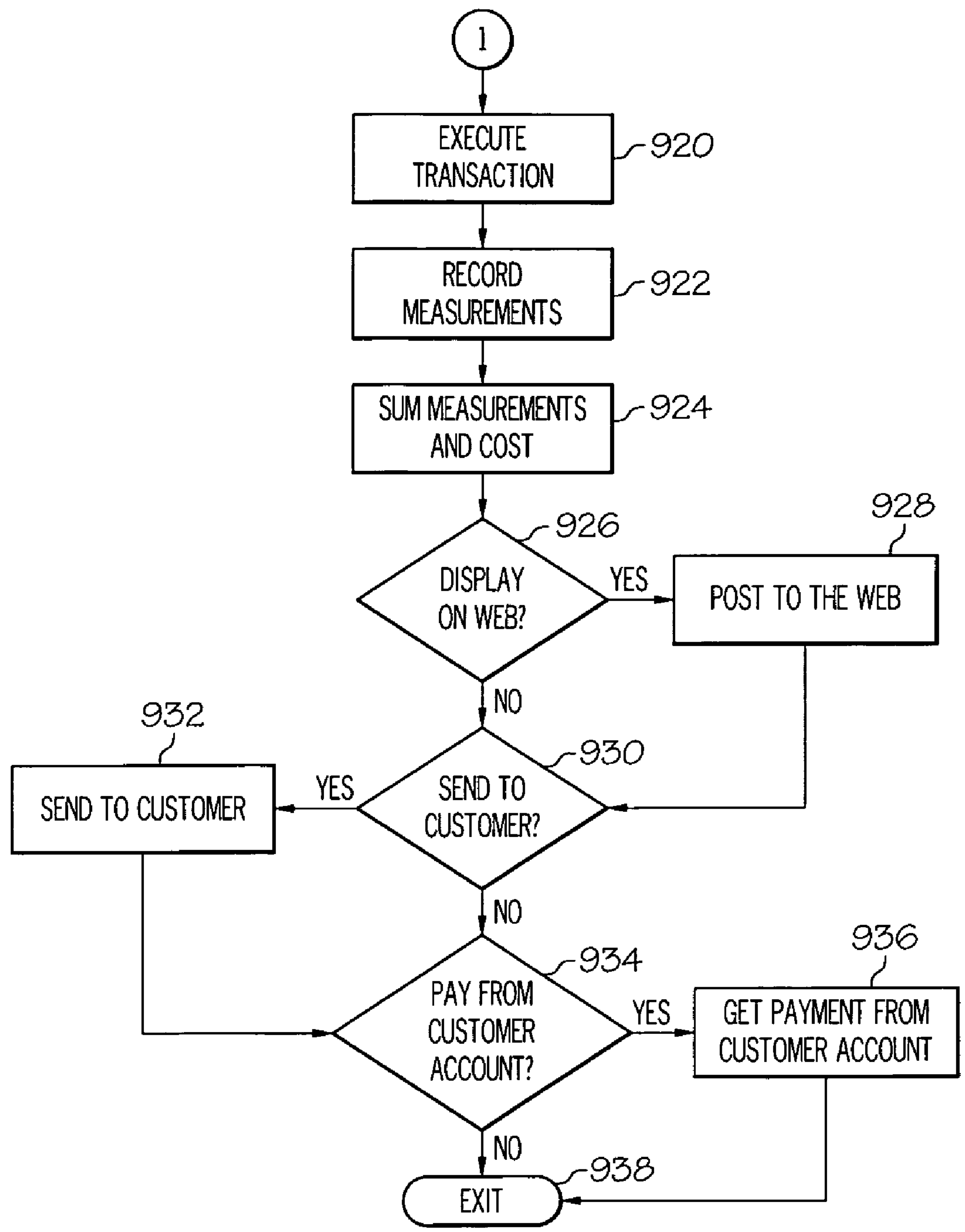

With reference now to FIGS. 9*a*-*b*, initiator block 902 begins the On Demand process. A transaction is created than contains the unique customer identification, the requested service type and any service parameters that further, specify the type of service (block 904). The transaction is then sent to the main server (block 906). In an On Demand environment the main server can initially be the only server, then as capacity is consumed other servers are added to the On Demand environment.

The server central processing unit (CPU) capacities in the On Demand environment are queried (block 908). The CPU requirement of the transaction is estimated, then the servers available CPU capacity in the On Demand environment are compared to the transaction CPU requirement to see if there is sufficient CPU available capacity in any server to process the transaction (query block 910). If there is not sufficient server CPU available capacity, then additional server CPU capacity is allocated to process the transaction (block 912). If there was already sufficient Available CPU capacity then the transaction is sent to a selected server (block 914).

Before executing the transaction, a check is made of the remaining On Demand environment to determine if the environment has sufficient available capacity for processing the transaction. This environment capacity consists of such things as but not limited to network bandwidth, processor memory, storage etc. (block 916). If there is not sufficient available capacity, then capacity will be added to the On Demand environment (block 918). Next the required software to process the transaction is accessed, loaded into memory, then the transaction is executed (block 920).

The usage measurements are recorded (block 922). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 924).

If the customer has requested that the On Demand costs be posted to a web site (query block 926), then they are posted (block 928). If the customer has requested that the On Demand costs be sent via e-mail to a customer address (query block 930), then these costs are sent to the customer (block 932). If the customer has requested that the On Demand costs be paid directly from a customer account (query block 934), then payment is received directly from the customer account (block 936). The On Demand process is then exited at terminator block 938.

The present invention thus provides a method, system and computer-usable medium for attributing memory usage in a memory heap to a particular component within a large software system or type of component by evaluating objects used by the software system or software system type. The method includes the steps of creating an object graph of a memory heap, wherein the object graph includes nodes that represent objects and associated properties of the objects, and wherein the object graph includes connectors that represent relationships between the objects in the memory heap; observing nodes in one or more subgraphs of the object graph, wherein the nodes represent objects that are selected for observation by a pre-determined criteria; searching for characteristic node properties of nodes that are sampled, from the subgraph, for observation; searching for characteristic topological properties of the subgraph that sampled nodes participate in; and applying a set of pre-determined domain-specific pattern matching filters to the node characteristic properties and the topological characteristic properties to attribute memory usage to a proper software component in a system. In one embodiment, the method also includes the steps of observing one or more related objects, wherein the related objects are live objects that functionally interact with nodes in the subgraph, and wherein the related objects are depicted outside the subgraph; searching for the characteristic node properties in the related objects; searching for the characteristic topological properties in the related objects; and applying the set of pre-determined domain-specific pattern matching filters to the node characteristic properties and the topological characteristic properties, to the related objects, to attribute memory usage to the proper software component in the system. The objects in the subgraph may continue to be implementable by an application while the objects are being observed, and/or objects in the subgraph are observed in real-time. In another embodiment, the method includes the steps of determining a pathway between a Garbage Collection (GC) root object and one or more observed objects that are observed in the subgraph; and applying set of pre-determined domain-specific pattern matching filters to the pathway between the GC root object and the one or more observed objects to attribute memory usage to a proper software component in a system. The method can be applied to any environment, including a Windows® environment having multiple processes, or a Java environment executing as a single process inside an operating system.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implementable method comprising:

creating an object graph of a portion of a memory heap, wherein the object graph includes nodes that represent objects and associated properties of the objects, and wherein the object graph includes connectors that represent relationships between the objects in the memory heap;

observing nodes in one or more subgraphs of the object graph, wherein the nodes represent objects that are selected for observation by a pre-determined criteria, and wherein the objects in a subgraph are observed while executing in real-time;

searching for characteristic node properties of nodes that are sampled, from the subgraph, for observation;

searching for characteristic topological properties of the subgraph that sampled nodes participate in, wherein the characteristic topological properties are action stereotypes that describe actions taken by a first object to call a second object;

applying a set of pre-determined domain-specific pattern matching filters to the node characteristic properties and the topological characteristic properties to identify particular software component and to attribute memory usage to the particular software component in a system, wherein the pre-determined domain-specific pattern matching filters identify a particular software type that describes the particular software component;

observing one or more related objects, wherein the related objects are live objects that functionally interact with nodes in the subgraph, and wherein the related objects are depicted outside the subgraph;

searching for the characteristic node properties in the related objects;

searching for the characteristic topological properties in the related objects;

applying the set of pre-determined domain-specific pattern matching filters to the node characteristic properties and the topological characteristic properties, to the related objects, to attribute memory usage to the particular software component in the system;

determining a pathway between a Garbage Collection (GC) root object and one or more observed objects that are observed in the subgraph; and applying the set of pre-determined domain-specific pattern matching filters to the pathway between the GC root object and the one or more observed objects to determine a quantity of memory usage used by a particular software component in a system.

2. A system comprising:

a processor;

a data bus coupled to the processor;

a memory coupled to the data bus; and a tangible computer-usable medium on which is stored computer program code, the computer program code comprising instructions executable by the processor and configured for:

creating an object graph of a portion of a memory heap, wherein the object graph includes nodes that represent objects and associated properties of the objects, and wherein the object graph includes connectors that represent relationships between the objects in the memory heap;

observing nodes in one or more subgraphs of the object graph, wherein the nodes represent objects that are selected for observation by a pre-determined criteria, and wherein the objects in a subgraph are observed while execution in real-time;

searching for characteristic node properties of nodes that are sampled, from the subgraph, for observation;

searching for characteristic topological properties of the subgraph that sampled nodes participate in, wherein the characteristic to topological properties are action stereotypes that describe actions taken by a first object to call a second object;

applying a set of pre-determined domain-specific pattern matching filters to the node characteristic properties and the topological characteristic properties to identify a particular software component and to attribute memory usage to the particular software component in a system, wherein the pre-determined domain-specific pattern matching filters identify a particular software type that describes the particular software component;

observing one or more related objects, wherein the related objects are live objects that functionally interact with nodes in the subgraph, and wherein the related objects are depicted outside the subgraph;

searching for the characteristic node properties in the related objects;

searching for the characteristic topological properties in the related objects;

applying the set of pre-determined domain-specific pattern matching filters to the node characteristic properties and the topological characteristic properties, to the related objects, to attribute memory usage to the particular software component in the system;

determining a pathway between a Garbage Collection (GC) root object and one or more observed objects that are observed in the subgraph; and applying the set of pre-determined domain-specific pattern matching filters to the pathway between the GC root object and the one or more observed objects to determine a quantity of memory usage used by a particular software component in a system.

3. A tangible computer-usable medium on which is stored computer program code, the computer program code comprising computer executable instructions configured for:

creating an object graph of a portion of a memory heap, wherein the object graph includes nodes that represent objects and associated properties of the objects, and wherein the object graph includes connectors that represent relationships between the objects in the memory heap;

observing nodes in one or more subgraphs of the object graph, wherein the nodes represent objects that are selected for observation by a pre-determined criteria, and wherein the objects in a subgraph are observed while executing in real-time;

searching for characteristic node properties of nodes that are sampled, from the subgraph, for observation;

searching for characteristic topological properties of the subgraph that sampled nodes participate in, wherein the characteristic topological properties are action stereotypes that describe actions taken by a first object to call a second object;

applying a set of pre-determined domain-specific pattern matching filters to the node characteristic properties and the topological characteristic properties to identify a particular software component and to attribute memory usage to the particular software component in a system, wherein the pre-determined domain-specific pattern matching filters identify a particular software type that describes the particular software component;

observing one or more related objects, wherein the related objects are live objects that functionally interact with nodes in the subgraph, and wherein the related objects are depicted outside the subgraph;

searching for the characteristic node properties in the related objects;

searching for the characteristic topological properties in the related objects;

applying the set of pre-determined domain-specific pattern matching filters to the node characteristic properties and the topological characteristic properties, to the related objects, to attribute memory usage to the particular software component in the system;

determining a pathway between a Garbage Collection (GC) root object and one or more observed objects that are observed in the subgraph; and applying the set pre-determined domain-specific pattern matching filters to the pathway between the GC root object and the one or more observed objects to determine a quantity of memory usage used by a particular software component in a system, wherein the computer executable instructions are provided by a service provider to a customer in an on-demand basis.

* * * * *